Figure 1:
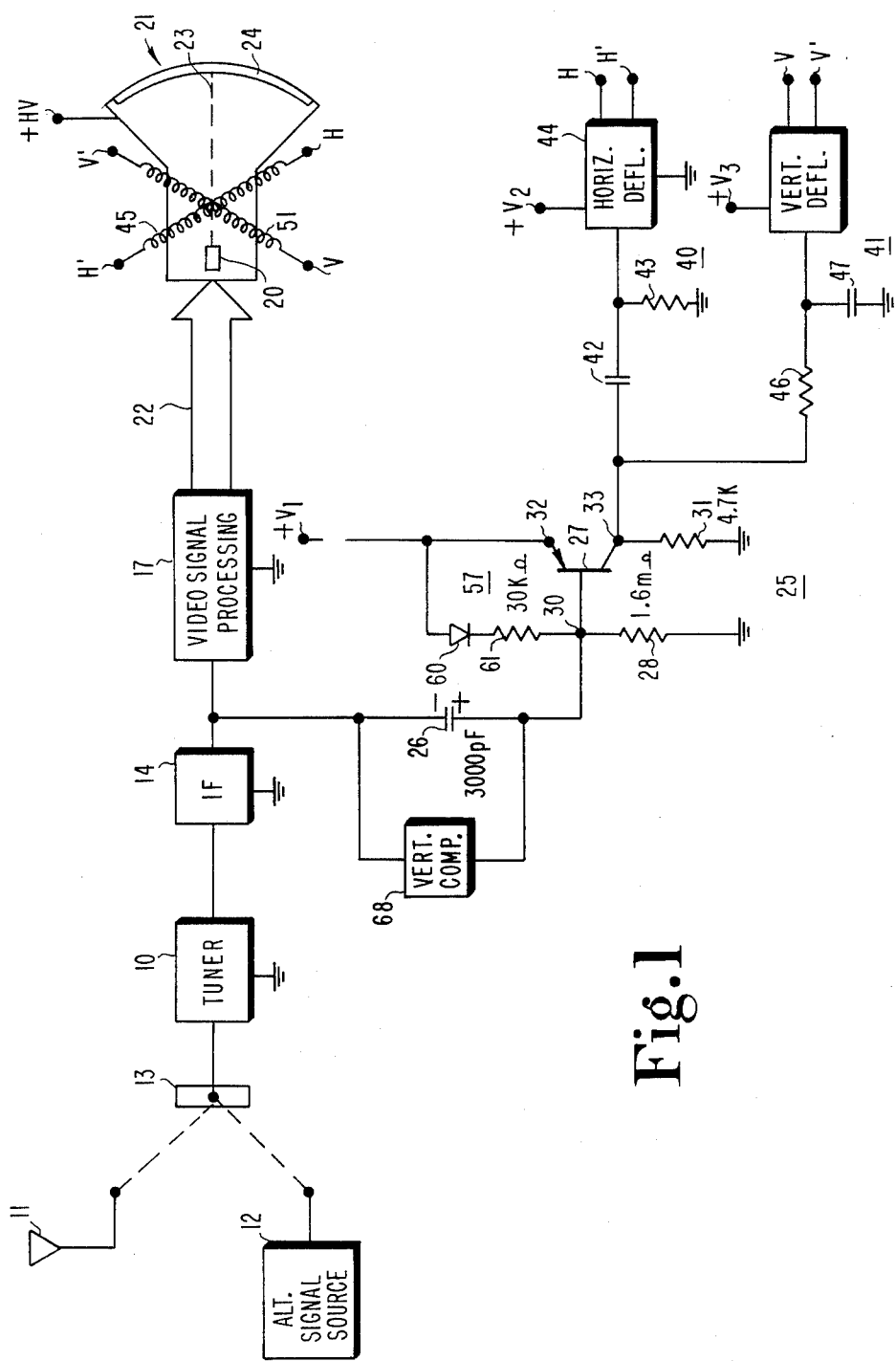

United States Patent [19]

Bell et al.

[11] Patent Number: 4,745,477
[45] Date of Patent: May 17, 1988

[54] ANTIJITTER ARRANGEMENT FOR SYNCHRONIZING PULSE SEPARATOR

[75] Inventors: Isaac M. Bell; Thomas D. Gurley, both of Indianapolis, Ind.

[73] Assignee: RCA Corporation, Princeton, N.J.

[21] Appl. No.: 882,560

[22] Filed: Jul. 7, 1986

[51] Int. Cl.[4] .............................................. H04N 5/08
[52] U.S. Cl. .................................... 358/153; 358/155
[58] Field of Search ............... 358/148, 153, 155, 156, 358/157, 154

[56] References Cited

U.S. PATENT DOCUMENTS

| | | | |
|---|---|---|---|
| 3,441,669 | 4/1969 | Janson et al. | 358/155 |
| 3,879,576 | 4/1975 | Okada et al. | 358/153 |
| 4,313,137 | 1/1982 | Weismueller | 358/154 |
| 4,357,629 | 11/1982 | McGinn | 358/153 |

FOREIGN PATENT DOCUMENTS

| | | | |
|---|---|---|---|
| 0153885 | 11/1981 | Japan | 358/153 |
| 0194467 | 11/1983 | Japan | 358/153 |

Primary Examiner—James J. Groody
Assistant Examiner—Michael D. Parker
Attorney, Agent, or Firm—Paul J. Rasmussen; Joseph J. Laks; Scott J. Stevens

[57] ABSTRACT

A synchronizing pulse separator for a video apparatus provides horizontal and vertical synchronizing pulses from a composite video signal. The sync separator incorporates a compensation circuit that achieves noise immune operation with composite video signals that provide progressive field display and consequently lack synchronization equalizing pulses. The compensation circuit maintains a sufficient bias level on the sync separator transistor during the vertical blanking interval to prevent premature triggering of the vertical deflection circuit due to noise.

5 Claims, 3 Drawing Sheets

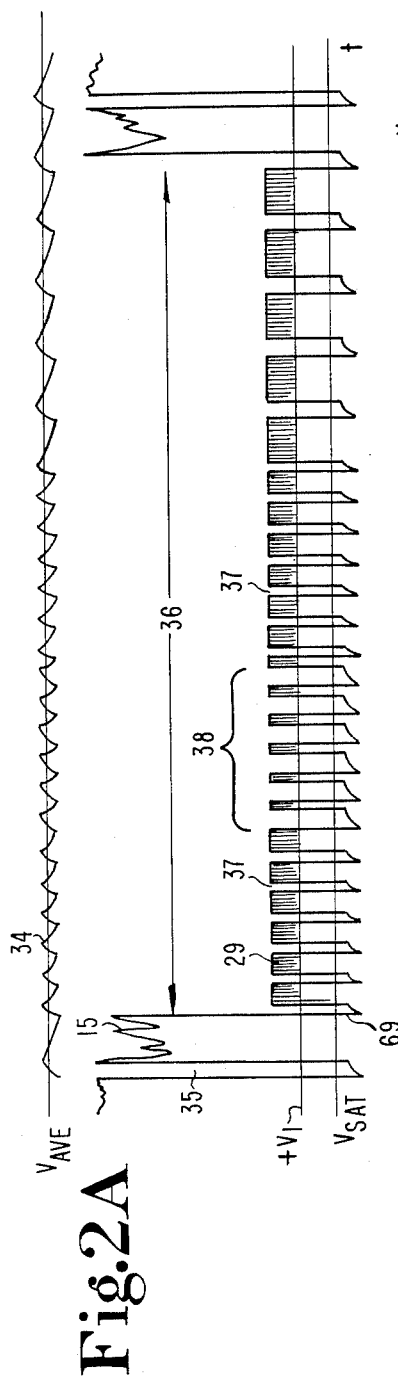
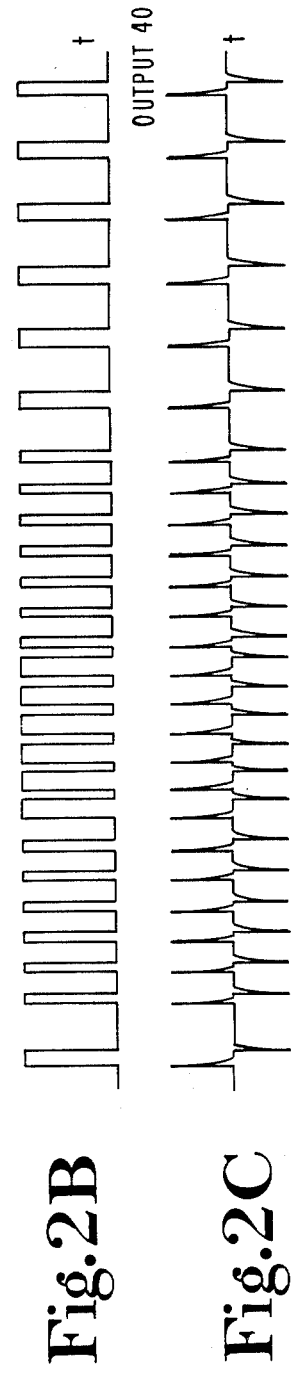
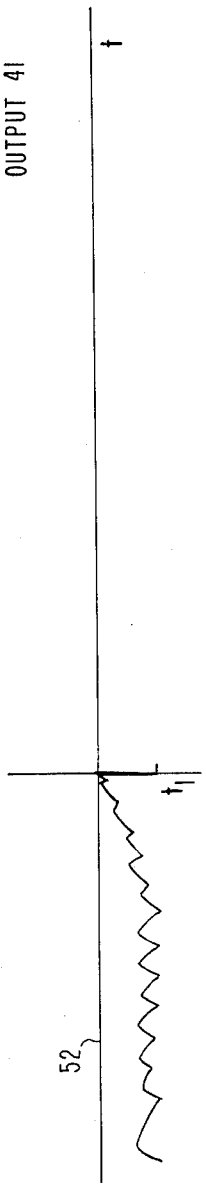
Fig.2A
Fig.2B
Fig.2C
Fig.2D

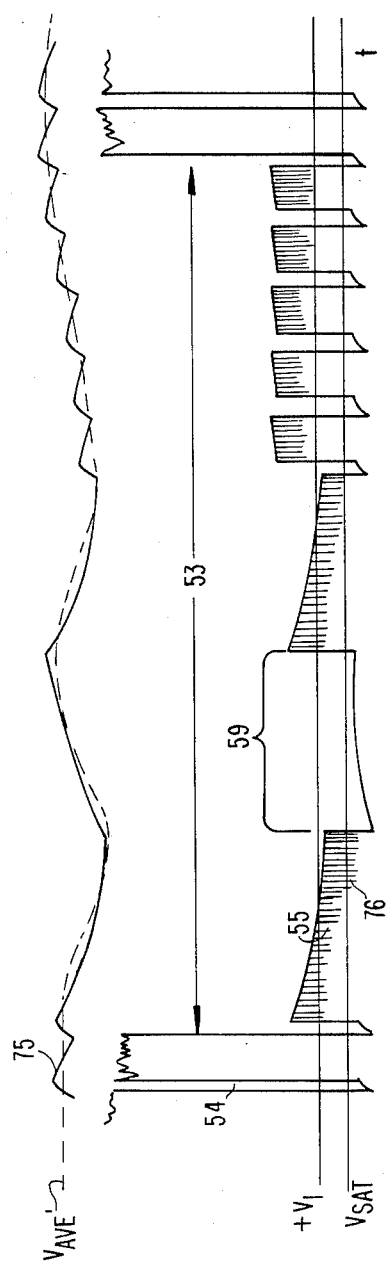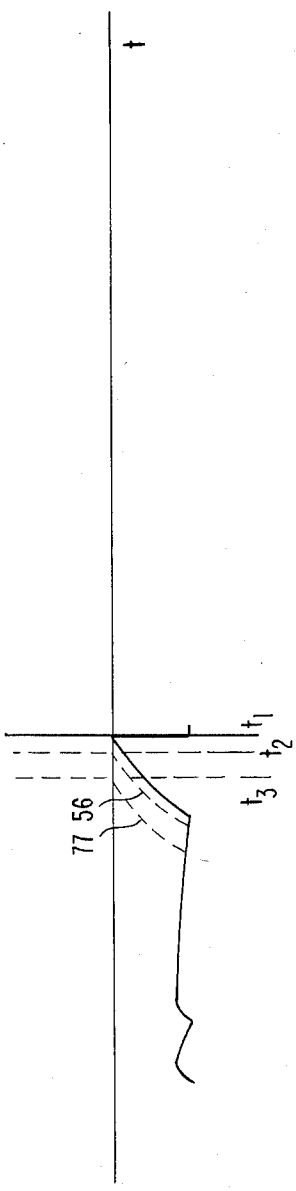

ANTIJITTER ARRANGEMENT FOR SYNCHRONIZING PULSE SEPARATOR

This invention relates to video display apparatus and, in particular, to synchronizing circuits for video display apparatus for use with standard and non-standard signal sources.

A video display apparatus, such as a televison receiver, may receive a composite video signal that contains audio and video information, as well as line and field rate synchronizing information. The synchronizing information is used to properly trigger the horizontal and vertical deflection circuits that cause scanning of the electron beam or beams of a cathode ray tube in order to produce the desired raster on the cathode ray tube display screen. The synchronizing (sync) information is extracted from the opposite video signal by a sync separator ciruciit. The sync separator circuit operates by sampling the composite video signal at a voltage level normally occupied only by the synchronizing information. Further processing separates the horizontal rate and vertical rate sync signals for application to their respective deflection circuitry.

The sync separator in a televison receiver is typically designed to respond to a video information signal from a "standard" signal source, such as an over-the-air broadcast or a cable TV signal, that is intended to produce scanner rasters having alternating fields of line-interlaced video information. The synchronizing information is configured to trigger the deflection circuits in an appropriate manner to produce the proper interlace of the lines of successive video fields. When the video display apparatus operates as a computer monitor or is intended to produce a video game display, for example, the video signal from these "non-standard" signal sources may be of a form that provides noninterlaced fields of information. The sync information generated by a nonstandard signal source may cause the sync separator to operate improperly, with the resultant occurence of an undesirable visible effect, such as vertical raster jitter. Circuitry that modifies the nonstandard sync signal to cause it to appear as a standard sync signal when applied to the sync separator may be costly and complex. It is important, also, that any nonstandard signal modifying circuitry have little or no effect on the operation of the sync separator when a standard video signal is present.

In accordance with an aspect of the present invention, a synchronizing pulse separator for a video display apparatus comprises a source of video information signals that incorporate line and field rate synchronizing information. A capacitor is connected to the source of video information signals. A transistor has a first terminal connected to a source of potential, a second terminal connected to the capacitor and a third terminal. The transistor is rendered conductive by the video information signal and produces an output signal at the third terminal that is representative of the line and field rate synchronizing information. The capacitor is charged during conduction of the transistor in order to establish a bias on the transistor. Circuitry is connected between the source of potential and the transistor second terminal in order to maintain the bias on the transistor.

In the accompanying drawing, FIG. 1 is a block and schematic diagram of a portion of a video display apparatus incorporating a sync separator in accordance with an aspect of the present invention; and FIGS. 2A–2F illustrate waveforms useful in understanding the operation of the circuitry of FIG. 1.

Referring to FIG. 1, there is shown a portion of a video display apparatus incorporating a tuner 10 that illustratively receives an input signal from either an antenna 11 or an alternate signal source 12, such as a computer or a video game. The signal from antenna 11 or signal source 12 is applied to tuner 10 via a user accessible input terminal strip 13. Tuner 10 demodulates the input signal and applies the resultant signal to intermediate frequency (IF) processing circuitry 14 which generates a composite video signal, shown in FIG. 2A, that includes video information, designated 15, and line and field rate synchronizing information. The composite video signal is applied to video signal processing circuit 17 which, for a color video display apparatus, produces the red, green, and blue color drive signals which are applied to the electron gun assembly 20 of a cathode ray tube (CRT) 21 via a conductor designated 22. Electron gun assembly 20 produces electron beam or beams 23 that are caused to impinge on a phosphor display screen 24 of CRT 21.

The composite video signal is also applied to a synchronizing (sync) pulse separator circuit 25. Sync separator 25 includes a capacitor 26 and a transistor 27. Transistor 27, illustratively of the pnp type, has its base terminal 30 connected to one terminal of capacitor 26 and, via a resistor 28, to ground. The other terminal of capacitor 26 is coupled to IF circuit 14 and receives the composite video signal. The emitter terminal 32 of transistor 27 is coupled to a soruce of potential, designated $+V_1$. The $+V_1$ potential may be produced by a regulated power supply (not shown) of conventional design embodied as part of the video display apparatus. The collector terminal 33 of transistor 27, which provides the output of sync separator 25, is also coupled via a resistor 31 to ground. A vertical compensation circuit 68 is connected across capacitor 26 to change the sync separator time constant during the vertical sync pulse interval in order to insure proper operation of the sync separator.

Transistor 27 is rendered conductive by the presence of the composite video signal from IF circuit 14. Conduction of transistor 27 causes a capacitor 26 to charge, with the polarity shown in FIG. 1, from the $+V_1$ supply via the emitter-base junction of transistor 27. The voltage established across capacitor 26, $V_{AVE}$ in FIG. 2A, biases transistor 27 so that transistor 27 is turned on only by the synchronizing information components of the composite video signal; i.e., that portion of the video signal exceeding the $V_{SAT}$ voltage level, designated 69 in FIG. 2A. Noise signal components 29 present in the composite video signal are of insufficient amplitude to render transistor 27 conductive. As can be seen by the capacitor 26 voltage waveform 34 of FIG. 2A, capacitor 26 changes during the presence of the sync pulses, such as horizontal sync pulses 35 or vertical sync pulse 38, for example, and discharges via resistor 28 between sync pulses when transistor 27 is nonconductive, so that the average voltage across capacitor 26 has a level designated $V_{AVE}$.

The output signal at collector terminal 33 of transistor 27, shown in FIG. 2B, is applied to differentiator circuit 40 and integrator circuit 41, as shown in FIG. 1. Differentiator circuit 40, comprising capacitor 42 and resistor 43, produces horizontal or line rate sync pulses, as shown in FIG. 2C, which are applied to horizontal deflection circuit 44 in order to trigger the operation of horizontal deflection circuit 44. Horizontal deflection circuit 44, which receives power from a source of voltage $+V_2$, produces horizontal deflection current, via terminals H and H', in a horizontal deflection winding 45, located on the neck of CRT 21. Horizontal deflection circuit 44, which may be of a conventional resonant retrace type, produces horizontal rate flyback or retrace pulses that are used to derive the high voltage or ultor potential +HV for CRT 21.

Integrator circuit 41, comprising resistor 46 and capacitor 47, integrates the output pulses of transistor 27 to form a vertical sync pulse signal as shown in FIG. 2D, which is applied to vertical deflection circuit 50. Vertical deflection circuit 50 is designed to be triggered by the sync pulse signal shown in FIG. 2D when it reaches a voltage level designated 52, which corresponds to a time $t_1$ in FIG. 2D. Vertical deflection circuit 50, which receives power from a source of voltage $+V_3$, generates vertical deflection current, via terminals V and V', in a vertical deflection winding 51, also located on the neck of CRT 21. The sync signals from differentiator 40 and integrator 41 act to synchronize the deflection currents of horizontal and vertical deflection circuits 44 and 50 so that the deflection of electron beam or beams 23 is synchronized with the video information provided by video signal processing circuit 17.

When the composite video signal comprises alternate interlaced fields of video information, such as that received via antenna 11, for example, the vertical blanking interval 36 includes equalizing pulses 37 that act to maintain synchronized operation of the horizontal deflection circuit. The presence of equalizing pulses 37 also maintain the average voltage across capacitor 26 to a level such that transistor 27 is rendered conductive only by the presence of sync pulses.

When the composite video signal is provided from alternate signal source 12, operating as a computer game, for example, the video information may result in a progressive, rather than an interlaced scan. Equalizing pulses will therefore not be incorporated within the vertical blanking interval 53, as shown by an illustrative composite video signal in FIG. 2E. The absence of equalizing pulses allows capacitor 26 to discharge via resistor 28 to a lower voltage level as shown by capacitor 26 voltage waveform 75, than that which would occur if equalizing pulses were present, resulting in the average voltage value on capacitor 26 being represented by line $V_{AVE}'$. The bias on transistor 27 due to the decreased charge on capacitor 26 is therefore reduced, such that the voltage level required to render transistor 27 conductive is reduced. It is possible that noise signal components 55, present in the composite video signal will be of sufficient amplitude, as shown in FIG. 2E at time 76, to render transistor 27 conductive. The additional conduction interval or intervals of transistor 27 due to the random noise signal components results in an increase in the output signal of integrator 41, as shown by dashed lines 56 and 77 in FIG. 2F, such that the trigger level 52 for vertical deflection circuit 50 is reached at a time $t_2$, or $t_3$ different than $t_1$. The random change in the time of triggering results in a visible vertical jitter of the display video information on display screen 24 of CRT 21.

In accordance with a novel aspect of the present invention, a compensation circuit 57 is coupled between the $+V_1$ supply and the gate terminal 30 of transistor 27. Compensation circuit 57 comprises the series combination of a diode 60 and a resistor 61 with diode 60 poled such that its anode terminal is coupled to the $+V_1$ supply. Compensation circuit 57 clamps the base bias voltage of transistor 27 to a level approximating that established by the presence of a composite video signal incorporating equalizing pulses. During the time transistor 27 is nonconductive, current flow through diode 60 and resistor 61 acts to provide charging current to capacitor 26 with the result that the average voltage across capacitor 26 remains substantially constant. The bias voltage on the base of transistor 27 remains at a level sufficient to prevent noise level components in the video signal from rendering transistor 27 conductive. When transistor 27 is rendered conductive by the occurrence of a sync pulse, the current conducted by transistor 27 much is greater than the current conducted by compensation circuit 57 in order to prevent interference of compensation circuit 57 with the operation of the sync separator. Diode 60 may be replaced by a transistor connected in a diode configuration, or by the series combination of two diodes, either of the same type or with one diode being a schottky diode, for example, while maintaining the desirable operation of compensation circuit 57. The voltage drop across diode 60 or its equivalent is selected to be slightly less than the base-emitter voltage of transistor 27 in order to allow diode 60 to conduct.

The sync separator of the present invention, therefore, provides jitter-free, noise immune operation for video signals that do not include equalizing pulses without degrading the sync separator operation when equalizing pulses are present in the video signal.

What is claimed is:

1. A synchronizing pulse separator for a video display apparatus comprising:
   a source of video information signals incorporating line and field rate synchronizing information;
   a capacitor coupled to said source of video information signals;
   a transistor having a first terminal coupled to a source of potential, a second terminal coupled to said capacitor, and a third terminal, said transistor being rendered conductive by said video information signals for producing an output signal at said third terminal representative of said line field rate synchronizing information, said capacitor being charged during conduction of said transistor and discharged when said transistor is nonconducting for establishing a bias on said transistor; and
   means coupled between said source of potential and said second terminal for establishing a current conduction path solely from said source of potential to said second terminal for maintaining said bias on said transistor.

2. The arrangement defined in claim 1, wherein said bias maintaining means provides charging current to said capacitor.

3. The arrangement defined in claim 1, wherein said bias maintaining means comprises a voltage clamping means.

4. The arrangement defined in claim 3, wherein said voltage clamping means comprises a diode.

5. A synchronizing pulse separator for a video display apparatus comprising:
   a source of first video information signals incorporating a line and field rate synchronizing information signal having equalizing pulses;

a source of second video information signals incorporating a line and field rate synchronizing information signal having no equalizing pulses;

a capacitor;

means for coupling one of said first video information signal source and said second video information signal source to said capacitor;

a transistor having a first terminal coupled to a source of potential, a second terminal coupled to said capacitor, and a third terminal providing an output signal representative of line and field rate synchronizing information in response to the application of said one of said first and second video information signals to said capacitor, said capacitor being charged to a first average voltage level in response to the application of said first video information signal to said capacitor and to a second average voltage level in response to the application of said second video information signal to said capacitor; and means coupled between said source of potential and said second terminal of said transistor for conducting current solely from said source of potential to said second terminal for maintaining said capacitor charged to substantially said first average voltage level when said second video information signal is applied to said capacitor.

* * * * *